Figure 1:
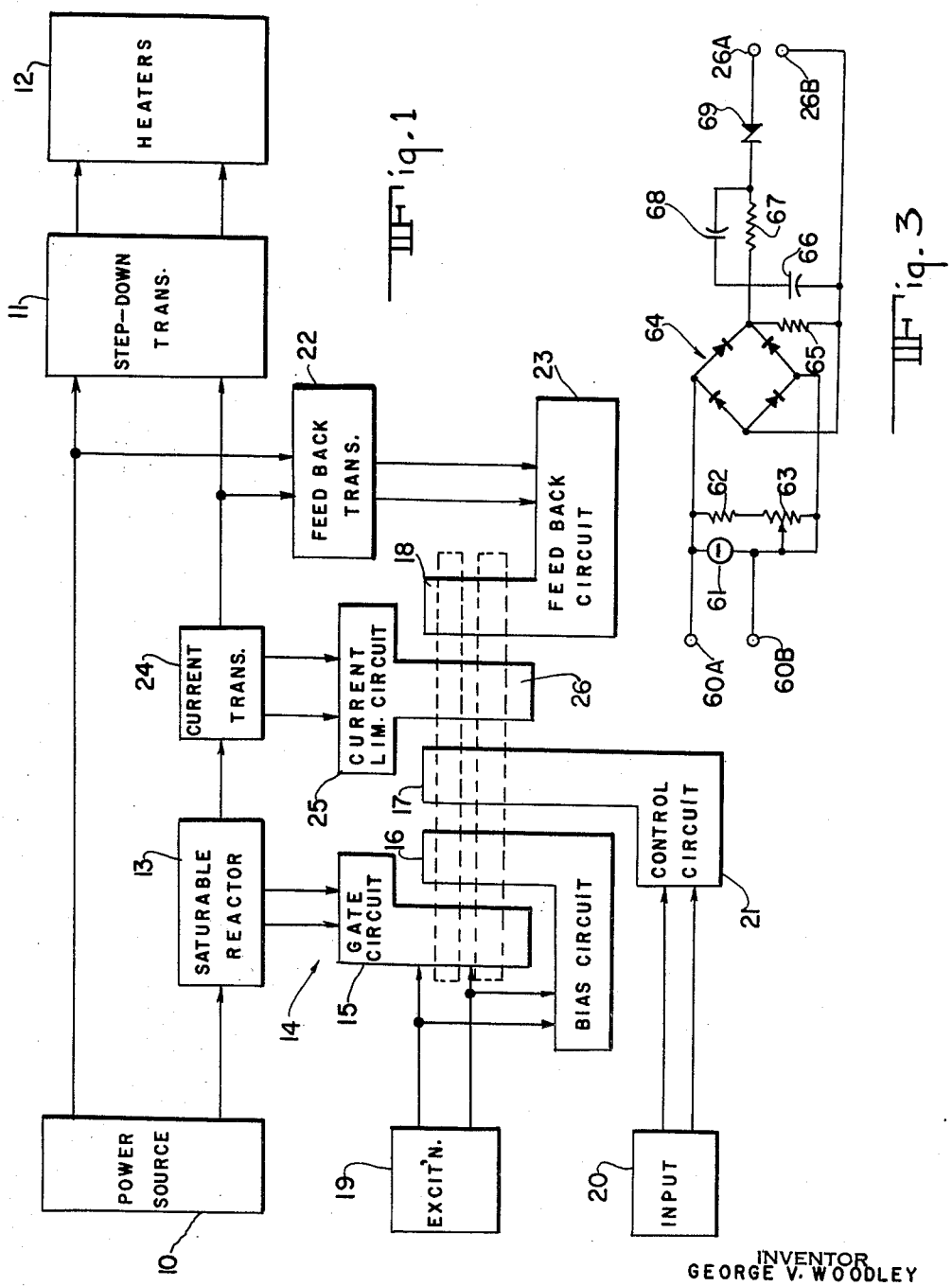

INVENTOR
GEORGE V. WOODLEY
BY
Robertson & Smythe
ATTORNEY

United States Patent Office 3,178,634
Patented Apr. 13, 1965

3,178,634
VOLTAGE REGULATOR WITH A SATURABLE REACTOR UTILIZING PREDETERMINED NONLINEAR FEEDBACK MEANS
George V. Woodley, Quincy, Mass., assignor to Basic Products Corporation, Milwaukee, Wis., a corporation of Wisconsin
Filed Apr. 3, 1961, Ser. No. 100,054
6 Claims. (Cl. 323—89)

This invention relates to a system for controlling the power delivered to a load and particularly to a system in which a predetermined change in the control signal produces the same per-unit change in the power delivered.

In the manufacture of glass, the furnace may be heated by electrical heating elements. The heating elements may be "Globar" electrodes or, in other cases, molybdenum electrodes which are extended directly into the molten glass. In order to control both the viscosity and the density of the glass "globs" formed within the furnace, it may be necessary to control the temperature within a range restricted to 0.1° C. With such close control of temperature, the glass globs are maintained in proper condition for subsequent transfer to glass forming machines.

In operation of the furnace, both the glass load passing through the furnace and the temperature set point may be varied for different conditions. In some applications, the furnace may be one which receives molten glass and then maintains a predetermined temperature level within the glass. With such operation, an increase in the load of molten glass being delivered requires a reduction in the electrical power delivered to the electrodes since the glass itself contains an appreciable quantity of heat. For reduced loads of molten glass, the opposite condition would result.

Control of the electrical power delivered to the furnace can be accomplished by the use of a saturable reactor which, in turn, is controlled by a magnetic amplifier. It is desirable that the saturable reactor and the magnetic amplifier together have a transfer characteristic such that the furnace controller need not be readjusted as to sensitivity and stability each time the loading and temperature of the furnace is changed. To avoid repeated adjustments of the controller for a change in operating conditions, it is necessary that a change in the control current provided by the magnetic amplifier to the saturable reactor produce the same per-unit power change from the reactor at any point in its operating range. An effective controller also requires provision for limiting the current delivered by the reactor to the load so that the equipment will not be damaged by excessive current.

One of the objects of the invention is to provide a controller in which a predetermined change in the control current will produce the same per-unit power change in the load governed by the controller.

Another object of the invention is to provide a controller in which a predetermined change in control current will produce the same per-unit power change in the load with the controller maintaining a maximum current limit for the load.

In one aspect of the invention, the system for controlling power delivered to a load includes magnetic amplifier means having gate winding means, control winding means, and feedback winding means. In addition, the system includes means for providing a control signal to the control winding means with the control signal being a function of the power to be delivered to the load. The system has means for providing a feedback signal to the feedback winding means with the feedback signal being a function of the power delivered to the load. Also included are means responsive to the output current of the gate winding means connected thereto to control the current to the load. In this manner, a predetermined change in the control signal produces the same per-unit change in the power delivered to the load.

In another embodiment of the invention, the system for controlling the power delivered to the load includes means for limiting the control signal in response to a predetermined load current.

In still another embodiment of the invention, the means for providing a feedback signal includes limiting means to control the magnitude of the feedback signal so that the control signal will have a substantially exponential characteristic with respect to the power delivered to the load.

Figure 2:
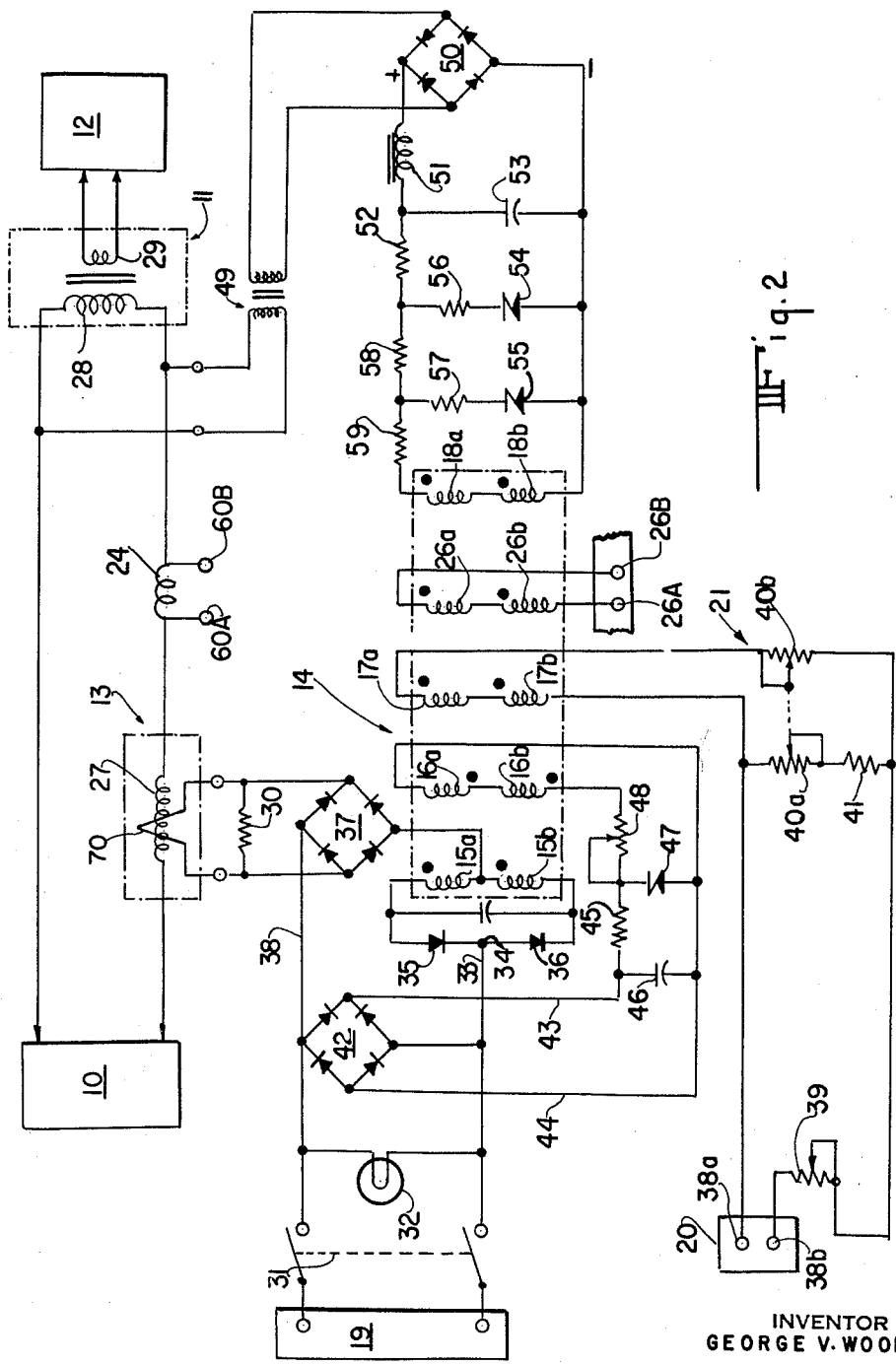

These and other objects, advantages and features of the invention will become apparent from the following description and drawings:

In the drawings:
FIG. 1 is a block diagram of the complete controller;
FIG. 2 is a schematic representation of the controller; and
FIG. 3 is a schematic representation of the current limiting circuit.

As shown in FIG. 1, the system includes power source 10 which delivers electric current through stepdown transformer 11 to heating means 12 of the electric furnace. Saturable reactor 13 is connected in series with the power source and the transformer to control the flow of current to the heaters. The system also includes magnetic amplifier 14 having gate windings 15, bias windings 16, control windings 17, feedback windings 18 and current limit windings 26. Magnetic amplifier 14 is energized by source 19. Control device 20, which may be a temperature responsive means or other condition responsive means, provides an error signal to control circuit 21 which is connected to control windings 17 of the magnetic amplifier. In addition to the signal from the control device 20, feedback device 22 provides a signal to feedback circuit 23 connected to feedback windings 18. For the case where the controller is to limit the current delivered to heaters 12, current limiting signal source 24 is provided to furnish a signal to current limiting circuit 25 which is connected to current limit windings 26 of the magnetic amplifier.

The signal delivered by temperature control device 20 determines how much power is called for to heat the furnace and maintain the desired temperature. The control signal from control windings 17 in turn regulates the output of saturable reactor means 13 to vary the flow of current to the heating elements 12. The transformed voltage delivered to the heaters is sensed by feedback device 22 to furnish a feedback signal to feedback circuit 23 and then to feedback windings 18. Feedback circuit 23 varies the feedback signal delivered to feedback windings 18 so that the desired transfer characteristic from the temperature control device signal to the output power of the saturable reactor is obtained.

As shown in FIG. 2, power source 10 is serially connected through gate winding 27 of saturable reactor 13 to primary winding 28 of stepdown transformer 11. The secondary winding 29 of the stepdown transformer delivers the power to heating means 12 of the furnace. The impedance of saturable reactor 13 is varied by means of D.C. control current flowing through control winding 70. Resistor 30 is connected across the terminals of the control winding in order to match the winding to the output of magnetic amplifier 14.

The control signal for the saturable reactor is the output of magnetic amplifier 14. The magnetic amplifier is energized by source 19, which is connected by means of switch 31 to the circuit. Pilot lamp 32 serves to indicate whether the amplifier is energized. One of the terminals of source 19 is connected by line 33 to junction 34 of the amplifier. Depending upon the instantaneous polarity of the A.C. supply, rectifiers 35 or 36 conduct and permit the current to pass through control windings 15a or 15b and then to bridge rectifier 37. In FIG. 2, the dots adjacent the various windings indicate the sense of the windings in the usual manner. The return path to source 19 is by way of line 30. Rectified output from bridge rectifier 37 is the D.C. current which is the control current transmitted to windings 70.

Temperature control device 20 is connected to terminals 38a and 38b in order to provide a signal to control windings 17a and 17b. By means of potentiometer 39, the impedance presented to temperature control device 20 is adjusted as required. Adjustment of the input signal level may be effected by means of ganged potentiometers 40a and 40b. Potentiometer 40a is serially connected with resistor 41 across control device 20, while potentiometer 40b is serially connected with control windings 17a and 17b.

The bias current for bias windings 16a and 16b is provided by bridge rectifier 42 connected across source 19. The output of the bridge rectifier is connected to lines 43 and 44 which are provided with a filter network consisting of capacitor 46. Resistor 45 and zener diode 47 comprise a regulated source of bias voltage. The desired amount of bias current applied to the bias windings 16a and 16b is then adjusted by means of potentiometer 48.

The voltage across the load, as it appears across primary winding 28 of stepdown transformer 11, is the source of the feedback signal. This signal is coupled through stepdown transformer 49 to bridge rectifier 50. The output of bridge rectifier 50 is connected to a filter network consisting of choke 51 and capacitor 53, which in turn provides a D.C. signal which is proportional to the average of the feed back voltage as appearing across the secondary of transformer 49. This D.C. signal is then applied to an operational feedback network consisting of resistors 52, 56, 57, 58 and 59, and zener diodes 54 and 55. The output of this operational network is then applied to feedback windings 18a and 18b.

In operation, the negative feedback signal from primary winding 28, as rectified by rectifier 50, is applied to the feedback windings to oppose the input signal from temperature control device 20. In order to achieve a transfer characteristic for the controller wherein changes in control current to saturable reactor 13 will produce the same per-unit power change in the load, it is necessary that the controller have a substantially constant gain characteristic. This condition can be satisfied when the power curve is an exponential one. Consequently, it is necessary that the feedback network be arranged to provide the desired exponential characteristic. To achieve such a characteristic it is necessary to progressively reduce the current provided by rectifier 50. This can be achieved by sequentially introducing shunt loads across the rectifier. Zener diodes 54 and 55 as connected in the feedback network are reverse-biased by the D.C. polarity of the bridge rectifier. As the output of the rectifier increases, the breakdown point of the zener diodes is approached. By selecting zener diodes having predetermined breakdown voltages, the shunts resulting from their connection across the rectifier may be sequentially applied to the network. Thus, at least at two points in the operating characteristic of the network shown, the zener diodes will break down, resulting in a reduction of the slope of the feedback current with respect to the control current provided for reactor 13. In this manner, the feedback characteristic can be shaped to obtain the overall desired exponential characteristic for the controller.

It is understood that a greater plurality of zener diodes can be employed to obtain a greater number of incremental shunt values across rectifier 50. In this manner, means are provided for changing the feedback ratio as a function of feedback voltage.

Under cold conditions, heaters 12 have a low resistance and consequently must be protected from an excessive current condition during starting of the furnace, so that it may be desirable to have a current-limiting circuit. Current transformer 24 is employed to sense the current delivered to stepdown transformer 11 and ultimately to the load. In a conventional manner, the voltage across the current transformer is a direct function of the current passing through it. The voltage across terminals 60A and 60B is delivered to the current limiting network shown in FIG. 3. Film cutout 61 is connected across the terminals to serve as a protection device. By means of resistor 62 and potentiometer 63, the level of the signal from the current transformer 24 to the limiting network may be set. The current limiting signal is then rectified by bridge rectifier 64 and applied across resistor 65. The output of the rectifier is filtered by resistor 65 and capacitor 66. To prevent the possibility of a hunting condition, resistor 67 is shunted by capacitor 68. Since the positive terminal of rectifier 64 is attached to the equivalent cathode of zener diode 69, the zener diode is reverse-biased. With an increasing D.C. current limiting signal from rectifier 64, the breakdown point of zener diode 69 is approached. When the breakdown does occur, current flows through limit windings 26 which serve to reset the cores of magnetic amplifier 14 and thereby limit the control signal provided to reactor 13. Depending upon the setting of potentiometer 63, at a predetermined current level to the load, a current limit will be reached beyond which increasing error signals from temperature control device 20 will have no effect.

*Operation*

The temperature of the furnace, which is heated by heaters 12, is set and controlled by means of temperature control device 20. As an example, upon a lowering of the furnace temperature from the set point, an error signal results from the control device. With an increasing error signal, the current through control windings 17 of magnetic amplifier 14 increases, thereby elevating the level of flux in the iron cores within the control windings. The increase in flux effects a lowering of the impedance presented to gate windings 15 so that an increased control current is transmitted to control windings 29 of saturable reactor 13.

The increased control current through saturable reactor 13 lowers its impedance and enables a greater flow of current to stepdown transformer 11 and thence to heaters 12. Upon the increase of current to the heaters, the feedback signal from feedback device 22 increases. The level of the feedback signal, after being adjusted by feedback circuit 23, is reduced so that the current through feedback windings 18 decreases. The decrease in current results in an increase in the impedance presented to gate windings 15 so that the function of the feedback circuit is a negative one.

To ensure that a change in the control signal from control device 20 causes the same per-unit change in the power supplied to the heaters, it is necessary that feedback circuit 23 have a predetermined non-linear characteristic with respect to the power supplied to the load. To accomplish this, the feedback circuit contains shunting elements, including zener diodes or similar devices which are selected to break down at spaced apart feedback signal levels so that the non-linear function is obtained.

To protect the equipment from excessive currents, magnetic amplifier 14 includes limit windings 26. A current-responsive device, such as current transformer 24, senses the current to the load and applies a signal as a function thereof to the limit windings. As the load current increases a level is reached at which point zener diode 69 breaks down and permits current to flow through limit windings 26. Limit windings 26 have a sense in opposition to those of bias windings 16 so that, upon the flow of current through the limit windings, the net flux from the bias windings is reduced or neutralized. In this way, the impedance of the gate windings of the magnetic amplifier is increased at the current limit point so that no further increase in signal is delivered to reactor 13.

It is to be understood that the described embodiments are merely intended for the purpose of illustration and that the principles of the invention are not intended to be limited thereto except as defined in the appended claims.

What is claimed is:

1. In a system for controlling the power delivered to a load, the combination including amplifier means, means for providing a control signal to said amplifier means, said control signal being a predetermined function of the power to be delivered to said load, a feedback network responsive to the electrical output to the load for providing a feedback signal to said amplifier means, said feedback network including sequentially acting means for reducing the slope of the feedback signal with respect to increasing electrical output at least at two points in the operating range of said network for providing a feedback signal having a predetermined exponential function of the electrical output delivered to the load, and means responsive to the output of said amplifier means connected thereto to control the power to said load, whereby a predetermined change in said control signal produces the same per-unit change in the power delivered to the load.

2. In a system for controlling the power delivered to a load, the combination including amplifier means, means for providing a control signal to said amplifier means, said control signal being a predetermined function of the power to be delivered to said load, feedback signal means responsive to the voltage output to the load for providing a feedback signal to said amplifier means, said feedback signal means including a plurality of non-linear electrical elements having predetermined breakdown voltages responsive to the voltage output delivered to the load for varying the transfer impedance of the said feedback signal means in a predetermined manner to shape said feedback signal as a predetermined exponential function of the voltage output delivered to the load, and means responsive to the output of said amplifier means connected thereto to control the power to said load, whereby a predetermined change in said control signal produces the same per-unit change in the power delivered to the load.

3. In a system for controlling the power delivered to a load, the combination including amplifier means, means for providing a control signal to said amplifier means, said control signal being a predetermined function of the power to be delivered to said load, a feedback network responsive to the voltage output to the load for providing a feedback signal to said amplifier means, said feedback network including a plurality of sequentially acting zener diodes for reducing the slope of the feedback signal with respect to increase in said voltage output at least at two points in the operating range of said network for providing a feedback signal having a predetermined exponential function of the voltage output delivered to the load, means for limiting the output of said amplifier means in response to a predetermined level of power delivered to the load, and means responsive to the output of said amplifier means connected thereto to control the power to said load, whereby a predetermined change in said control signal produces the same per-unit change in the power delivered to the load.

4. In a system for controlling the power delivered to a load, the combination including amplifier means, means for providing a control signal to said amplifier means, said control signal being a predetermined function of the power to be delivered to said load, feedback signal means responsive to the voltage output to the load for providing a feedback signal to said amplifier means, said feedback signal means including a first and a second shunt circuit with resistor means connected between said shunt circuits, each of said shunt circuits including a resistor in series with a zener diode, said zener diodes being responsive to the voltage output delivered to the load for varying the transfer impedance of the said feedback signal means in a predetermined manner to shape said feedback signal as a predetermined exponential function of the voltage output delivered to the load, means for limiting the output of said amplifier means in response to a predetermined level of power delivered to the load, and means responsive to the output of said amplifier means connected thereto to control the power to said load, whereby a predetermined change in said control signal produces the same per-unit change in the power delivered to the load.

5. In a system for controlling the electrical power delivered to a load, a power circuit having an output adapted for connection to the load and an input adapted for connection to a source of power, control means in said power circuit for controlling the power delivered to the output, amplifier means connected to said control means, input means connected to said amplifier means for providing a control signal thereto, a feedback network connected from the output of said power circuit to said amplifier means, and said feedback network including a plurality of zener diodes in shunt relationship and having predetermined breakdown voltages for sequentially breaking down as the voltage delivered to the output of the power circuit increases for progressively reducing the slope of the feedback current as a function of the output voltage, whereby a predetermined change in the control signal produces a corresponding per-unit change in power delivered at the output of said power circuit.

6. In a system for controlling the A.C. electrical power delivered to a load such as the heating elements in glass furnaces and the like, apparatus for controlling the electrical power delivered to the load wherein a predetermined change in a control signal produces the same per-unit change in the power delivered to the load throughout the range of operation comprising control means for controlling the power delivered to the load, amplifier means connected to said control means, input means connected to said amplifier means for providing said control signal thereto, a feedback network having an input adapted to be responsive to the voltage being supplied to the load, said feedback network including rectifier means for rectifying the voltage input to said feedback network, filter means connected to said rectifier means, a plurality of shunt circuits shunted across the output of said filter means with resistance means between said shunt circuits, the output of said shunt circuits being supplied to said amplifier means, each of said shunt circuits including a resistor in series with a zener diode, said zener diodes each having a predetermined breakdown voltage for sequentially breaking down as the voltage being supplied to the load increases for progressively reducing the slope of the feedback current as a function of the load voltage with respect to increasing load voltage, whereby a predetermined change in the control signal produces a corresponding per-unit change in power delivered at the output of said power circuit.

References Cited by the Examiner

UNITED STATES PATENTS

| 2,697,201 | 12/54 | Harder | 323—66 |
| 2,724,040 | 11/55 | Mouzon | 323—66 X |
| 2,825,864 | 3/58 | Eagan | 323—66 X |
| 2,825,866 | 3/58 | Morse | 323—66 |
| 2,866,151 | 12/58 | Applin et al. | 323—66 |
| 2,931,968 | 4/60 | Hilker | 323—66 |
| 3,139,562 | 6/64 | Freeborn | 307—88.5 |

LLOYD McCOLLUM, *Primary Examiner.*

MILTON O. HIRSHFIELD, *Examiner.*